Nov. 3, 1964 V. J. MODIANO 3,155,839
MAJORITY LOGIC CIRCUIT USING A CONSTANT CURRENT BIAS
Filed May 25, 1960
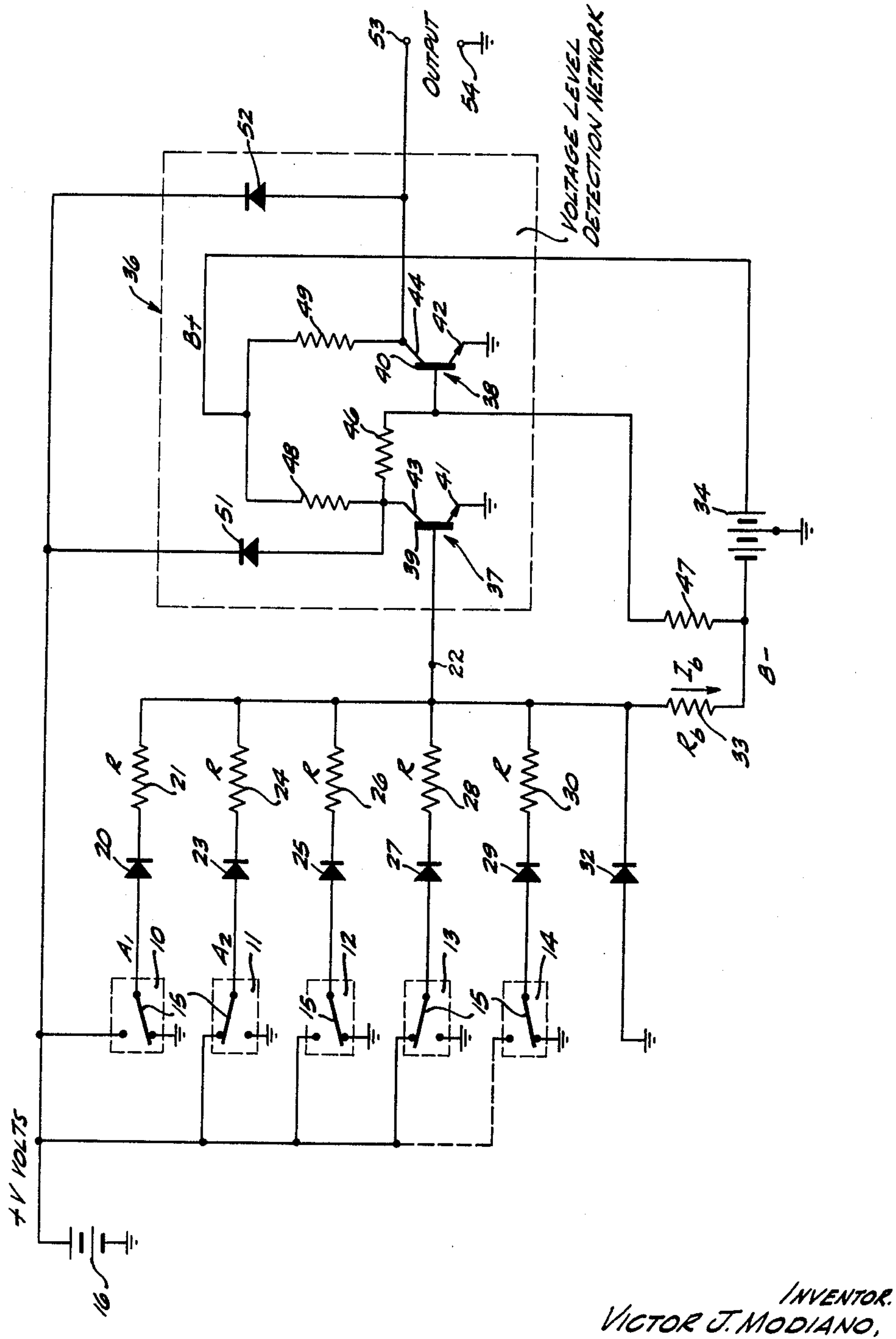
INVENTOR.
VICTOR J. MODIANO,
BY Robert H. Himes
ATTORNEY.

United States Patent Office 3,155,839

Patented Nov. 3, 1964

3,155,839

MAJORITY LOGIC CIRCUIT USING A CONSTANT CURRENT BIAS

Victor J. Modiano, Anaheim, Calif., assignor to Hughes Aircraft Company, Culver City, Calif., a corporation of Delaware Filed May 25, 1960, Ser. No. 31,779
3 Claims. (Cl. 307—88.5)

This invention relates to logical circuit apparatus adapted for use in digital computers and, more particularly, to a combination "and-or" network wherein an information level output signal is generated in response to the existence of no less than a fixed number of information level signals on a greater number of input leads.

In order to accomplish the gating achieved by the present invention by conventional techniques, it is first necessary to apply every conceivable combination of the fixed number of output leads to respective "and" gates and then apply the outputs of the "and" gates to an "or" gate. By way of example, assume that it is desired to produce an information level signal when any two of three input leads are at the information level. To accomplish this, it is necessary to use three two-input "and" gates and a three-input "or" gate. On the other hand, if it were desired to produce an information level signal when any two of ten input leads were at the information level, it would be necessary to use forty-five two-input "and" gates and a forty-five input "or" gate.

It is therefore an object of the present invention to provide an improved combination logical element for use in digital computers.

Another object of the present invention is to provide an improved combination "and-or" gating apparatus.

Still another object of the present invention is to provide a combination "and-or" gating apparatus which uses substantially fewer components than are required when present day gating apparatus is employed.

In accordance with the present invention, input signals are employed by way of example wherein an information level is represented by +V volts and a zero level is represented by ground potential. A uni-directional conducting device is connected from ground to an output terminal and the output terminal, in turn, connected through a biasing resistor to a source of negative potential. The uni-directional conducting device is poled to allow current to flow from ground towards the source of negative potential and the resistance of the biasing resistor is made sufficiently large so that the current flow therethrough remains substantially constant. The input signals are applied through respective serially connected uni-directionally conducting devices and voltage dropping resistors to the output terminal. In the event that it is desired to "and" any two input signals, the potential drop across the voltage dropping resistors for a current flow equivalent to the entire flow through the biasing resistor is made substantially equal to V volts.

Thus, a zero level signal is generated at the output terminal when either none or one of the input signals is at the information level. When two or more input signals are at the information level, however, the potential drop across the voltage dropping resistors decreases thereby increasing the potential level appearing at the output terminal. This increase in potential level is then converted to an information level output signal. Further, the teachings of the present specification are also applicable when it is desired that an increase in the potential level at the output terminal occur when the number of input signals at the information level is greater than two but less than the total.

The above-mentioned and other features and objects of this invention and the manner of obtaining them will become more apparent by reference to the following description taken in conjunction with the accompanying drawing wherein the figure illustrates a schematic circuit diagram of a preferred embodiment of the present invention.

Referring now to the drawing, a plurality of input signals $A_1$, $A_2$, $A_3$ $A_4$ . . . $A_n$ is provided by signal sources 10, 11, 12, 13, and 14, respectively. Each of the signal sources 10–14 includes, by way of example, a single-pole, double-throw switch 15. Each of the switches 15 is adapted to either connect the output of the respective source to ground to provide a zero level input signal or to the positive terminal of a battery 16, the negative terminal of which is referenced to ground. The battery 16 is adapted to provide an output voltage of +V volts whereby an information level signal generated by the sources 10–14 is +V volts relative to ground.

The particular manner in which the switches 15 are controlled is not illustrated or described. It is considered within the scope of the teachings of the present specification, however, that either electromechanical switching means such as illustrated or other purely electronic means can be used to generate input signals for the present apparatus. In general, when the switches 15 connect the respective outputs of the sources 10–14 to ground, the signal $A_1$, $A_2$, $A_3$, $A_4$ . . . or $A_n$ is said to be at a "zero" level. Alternatively, when the switches 15 connect the output of the respective source 10–14 to the positive terminal of battery 16, the output signal $A_1$, $A_2$, $A_3$, $A_4$ . . . or $A_n$ is said to be at the "information level." All of the switches 15 will be assumed to be either connected to ground or to the positive terminal of the battery 16 during each bit interval of operation.

The output terminal of the input signal source 10 is connected through a diode 20 which is, in turn, connected in series with a resistor 21 to an output terminal 22. The diode 20 is poled so as to allow current to flow from the signal source 10 towards the output terminal 22. Similarly, source 11 is connected in series through a diode 23 and a resistor 24 to the output terminal 22; the source 12 is connected in series through a diode 25 and a resistor 26 to the output terminal 22; the source 13 is connected in series through a diode 27 and a resistor 28 to the output terminal 22; and the source 14 is connected in series through a diode 29 and a resistor 30 to the output terminal 22. In each case, the diodes 23, 25, 27, 29 are poled in directions to allow current to flow towards the output terminal 22. In addition, a by-pass diode 32 is connected from ground to the output terminal 22 and poled in a direction to allow current to flow towards the output terminal 22.

Further, the output terminal 22 is connected through a resistor 33 to the negative terminal of a battery 34, an intermediate terminal of which is connected to ground so as to provide a source of both B− and B+ potentials. In the present apparatus, the resistor 33 has a resistance $R_b$ which is large, particularly when compared to the forward resistance of the diode 32 or the resistance of any of the resistors 21, 24, 26, 28, or 30.

Under normal operation, if all of the input signals $A_1$, $A_2$, $A_3$, $A_4$ . . . $A_n$ are at the zero level, a current, $I_b$, flows from ground through the diode 32 and resistor 33 to the negative terminal of the battery 34. Because of the magnitude of the resistance $R_b$ of the resistor 33 compared to the resistance of one or more of the input circuits, the current $I_b$ through resistor 33 remains substantially constant irrespective of whether current flows through one or more of the input diodes 20, 23, 25, 27, 29 or through diode 32. According to the present invention, each of the resistors 21, 24 26, 28, 30 are substantially of the same resistance, R. In the event that it is desired to "and" any $m$ of the $n$ input signals $A_1, A_2 \ldots A_n$, $m$ being an integral number less than $n$ but no less than two, the resistance of $m-1$ of the resistors 21, 24, 26, 28, 30 connected in parallel is chosen so that the voltage drop thereacross with a current flow $I_b$ therethrough is equal to V volts. For example, if it is desired to "and" any two of the input signals $A_1, A_2 \ldots A_n$, the voltage drop across a single one of the resistors 21, 24, 26, 28, or 30 for a current flow of $I_b$ therethrough is made equal to V volts. It is thus apparent that the potential level of the output terminal 22 will remain at substantially zero volts until such time as $m$ of the input signals $A_1, A_2 \ldots A_n$ is at the information level at which time it will experience a voltage excursion in the positive direction.

The output terminal 22 is connected to the input of a voltage level detection network 36. The function of the voltage level detection network 36 is to produce a zero level output signal for all voltages less than a certain critical voltage, $E_c$, and to produce an information level output signal for all voltages greater than the critical voltage, $E_c$. The voltage level detection network 36 may, for example, comprise p-n-p transistors 37, 38 having, respectively, bases 39, 40, emitters 41, 42 and collectors 43, 44. The emitters 41, 42 are both connected to ground; the base 39 of transistor 37 is connected to the output terminal 22; and the base 40 of transistor 38 is connected through a resistor 46 to the collector 43 of transistor 37 and, in addition, is connected through a resistor 47 to the negative terminal of the battery 34 which provides the source of B— potential. The collectors 43, 44 of transistors 37, 38 are connected, respectively, through resistors 48, 49 to the positive terminal of the battery 34 which provides a B+ potential level. In addition, the collectors 43, 44 of the transistors 37, 38 are prevented from making more positive voltage excursions than +V volts relative to ground by diodes 51, 52 which are connected, respectively, from the collectors 43, 44 to the positive terminal of the battery 15 and poled in a direction so as to allow current to flow only towards the positive terminal thereof. Lastly, the collector 44 of transistor 38 is connected to an output terminal 53, a remaining output terminal 54 being connected to ground.

In order to illustrate the operation of the apparatus of the present invention, it will be assumed that it is desired to "and" any two of the input signals $A_1, A_2, A_3, A_4 \ldots A_n$. As shown in the drawing, input signals $A_1$, $A_3$ and $A_n$ are at the zero level and input signals $A_2$ and $A_4$ are at the information level. In operation, when only one of the input circuits is at the information level, current flow initially through diode 32 shifts so that it flows through the input circuit at the information level whereby the voltage drop through the respective resistors 21, 24, 26, 28, or 30 is equal to V volts thereby to produce a voltage level at the output terminal 22 that remains at substantially ground potential. When both the input signals $A_2$ and $A_4$ are at the information level, however, the resistance of the resistors 24, 28 in parallel becomes equal to $$\frac{R}{2}$$

ohms. Thus, the voltage drop for the current flow $I_b$ through the resistors 24 and 28 in parallel becomes $$\frac{V}{2}$$

volts. Hence, the voltage level at the output terminal 22 increases from substantially 0 volts to $$+\frac{V}{2}$$

volts when the number of input signals at the information level increases from one to two. If additional input signals increase to the information level, the potential level at the output terminal 22 increases slightly more.

The critical voltage, $E_c$, of the voltage level detection network 36 is chosen to be between the zero level and the $$+\frac{V}{2}$$

volt level in the case where two of the input signals $A_1$, $A_2 \ldots A_n$ are being "anded." In general, where it is desired to "and" $m$ input signals, the critical voltage, $E_c$, will be designed to occur between the zero level and the voltage level which appears at the output terminal 22 when $m$ of the input signals $A_1, A_2 \ldots A_n$ are at the information level. In operation a zero level signal applied to the base 39 of transistor 37 renders the transistor 37 non-conductive whereby the potential at the collector 43 tends to increase the B+ potential provided by the battery 34 but is limited to +V volts relative to ground by the diode 51. The +V voltage is then applied through resistor 46 to the base 40 of transistor 38, thus rendering the transistor 38 conductive. Current flow from the battery 34 through resistor 49 produces a potential drop which lowers the potential level at the output terminal 53 to substantially 0 volts.

Alternatively, if the voltage level appearing at the output terminal 22 is above the critical potential, $E_c$, the transistor 37 is rendered conductive whereby current flow through the resistor 48 produces a potential drop which lowers the voltage level at the collector 43 to substantially ground potential. The additional voltage drop through resistor 46 developed by current which flows through resistors 46 and 47 in series to the source of B— potential renders the transistors 38 non-conductive. Thus the voltage level at the collector 44 of transistor 38 tends to increase towards the B+ potential provided by the battery 34. This increase, however, is limited to +V volts relative to ground by the diode 52. This voltage developed at the collector 44 of transistor 38 appears at the output terminal 53 as an information level output signal.

It is considered to be within the scope of the present teachings to employ alternative means to provide voltage level detection such as, for example, a Schmitt trigger generator.

What is claimed is:

1. A combination gating apparatus for "anding" a constant number no less than two of a greater number of bi-level input signals which have zero and information potential levels, said gating apparatus comprising a by-pass uni-directionally conducting device connected from a first terminal maintained at a substantially fixed reference potential to a second terminal, said by-pass uni-directionally conducting device being poled to allow current to flow in a predetermined direction with respect to said second terminal; means connected to said second terminal for generating a constant flow of current in a direction with respect to said second terminal that is opposite said predetermined direction; a plurality of input terminals responsive to each respective bi-level input signal; a corresponding plurality of resistors and additional uni-directionally conducting devices interconnected in series between each respective input terminal and said second terminal, each additional uni-directionally conducting device being poled in the same direction with respect to said second terminal as said bypass uni-directionally conducting device, the resistance of each of said resistors being the same, and the resistance in parallel of a number equal to one less than said constant number of said resistors being substantially equal to the voltage difference between said zero and information potential levels of said bi-level input signals divided by the amperes constituting said constant flow of current, whereby a constant number of said bi-level input signals at information level increases the voltage level at said second terminal from said substantially fixed reference potential level to a second potential level; and means connected to said second terminal for producing a zero level output signal in response to said reference potential level and for producing an information level output signal in response to said second potential level.

2. A combination gating element for "anding" $m$ of $n$ bi-level input signals which have zero and information potential levels wherein $n$ is an integer no less than 3 and $m$ is an integer less than $n$ and no less than 2, said gating element comprising a by-pass diode connected from a first terminal maintained at a substantially fixed reference potential to a second terminal, said by-pass diode being poled to allow current to flow towards said second terminal; means connected to said second terminal for generating a constant current flow therefrom; $n$ input terminals responsive respectively to said $n$ bi-level input signals; $n$ input circuits each including an input resistor connected in series with an input diode interconnected between each respective input terminal and said second terminal, said input diodes being poled to allow current to flow towards said second terminal, the resistance of each of said input resistors being the same and the resistance of $m-1$ of said resistors in parallel being equal to the voltage difference between said zero and information potential levels of said bi-level input signals divided by said constant current whereby $m$ bi-level input signals at information level increase the voltage level at said second terminal from substantially fixed reference potential to a second potential level; and means connected to said second terminal for producing a zero level output signal in response to said substantially fixed reference potential level and for producing an information level output signal in response to said second potential level.

3. A gating element for "anding" any two of $n$ bi-level input signals which have zero and information potential levels wherein $n$ is an integer no less than 3, said gating element comprising a by-pass diode connected from a first terminal maintained at ground potential to a second terminal and poled to allow current to flow towards said second terminal; a source of negative direct current potential; a first resistor connected from said second terminal to said source of negative direct current potential, the magnitude of the resistance of said first resistor being substantially greater than the forward resistance of said by-pass diode whereby a substantially constant current flows therethrough; a plurality of $n$ input terminals responsive to each respective bi-level input signal; a corresponding plurality of series circuits each including an input resistor connected in series with an input diode, said series circuits being interconnected between each respective input terminal and said second terminal, said input diodes being poled to allow current to flow towards said second terminal, and the resistance of each of said input resistors being the same and equal to the voltage difference between said zero and information potential levels divided by said substantially constant current which normally flows through said first resistor whereby two bi-level input signals at information level increase the voltage at said second terminal from ground potential to a second potential level, and means connected to said second terminal for producing a zero level output signal in response to said reference potential level and for producing an information level output signal in response to said second potential level.

References Cited in the file of this patent

UNITED STATES PATENTS

| | | |
|---|---|---|
| 2,557,729 | Eckert | June 19, 1951 |
| 2,603,746 | Burkhart et al. | July 15, 1952 |
| 2,853,632 | Gray | Sept. 23, 1958 |
| 3,032,664 | Rowe | May 1, 1962 |
| 3,078,376 | Lewin | Feb. 19, 1963 |